US012742469B2

(12) United States Patent
Guo et al.

(10) Patent No.: US 12,742,469 B2
(45) Date of Patent: Sep. 22, 2026

(54) THRUST COMPONENT, ASSEMBLY METHOD THEREFOR, AND APPARATUS

(71) Applicant: Schaeffler Technologies AG & Co. KG, Herzogenaurach (DE)

(72) Inventors: Huaiwei Guo, Shanghai (CN); Bin Zhang, Shanghai (CN)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 376 days.

(21) Appl. No.: 18/687,073

(22) PCT Filed: Aug. 31, 2021

(86) PCT No.: PCT/CN2021/115534
§ 371 (c)(1),
(2) Date: Feb. 27, 2024

(87) PCT Pub. No.: WO2023/028808
PCT Pub. Date: Mar. 9, 2023

(65) Prior Publication Data
US 2024/0280143 A1 Aug. 22, 2024

(51) Int. Cl.
*F16B 21/18* (2006.01)
*F16C 35/067* (2006.01)

(52) U.S. Cl.
CPC .......... *F16B 21/183* (2013.01); *F16C 35/067* (2013.01)

(58) Field of Classification Search
CPC ...... F16B 21/18; F16B 21/183; F16B 21/186; F16C 35/063; F16C 35/067
USPC .......................................................... 411/517
See application file for complete search history.

(56) References Cited

U.S. PATENT DOCUMENTS

| | | | | |
|---|---|---|---|---|
| 3,561,087 A * | 2/1971 | Koehler | B22F 3/1109 | 277/924 |
| 4,184,242 A * | 1/1980 | Petrie | B21D 53/20 | 72/340 |
| 4,343,581 A * | 8/1982 | Millheiser | F16B 21/18 | 411/517 |
| 2018/0313387 A1* | 11/2018 | Aoki | F16B 43/001 | |

FOREIGN PATENT DOCUMENTS

| | | | | |
|---|---|---|---|---|
| CN | 110230684 A | | 9/2019 | |
| CN | 213744544 U | | 7/2021 | |
| GB | 674514 A | * | 6/1952 | F16B 21/18 |
| JP | 2001065584 A | | 3/2001 | |
| JP | 2010038254 A | * | 2/2010 | F16C 35/067 |
| JP | 2010107018 A | | 5/2010 | |
| JP | 2010121663 A | | 6/2010 | |
| JP | 2013014213 A | | 1/2013 | |
| WO | 2008154916 A2 | | 12/2008 | |

* cited by examiner

*Primary Examiner* — Nicholas L Foster
(74) *Attorney, Agent, or Firm* — Price Heneveld LLP

(57) ABSTRACT

A thrust component is used for fixing an engaged member on a housing, said component comprises a stop ring and a position limiting structure; a second outer surface of the stop ring is provided with a stop flat portion and a stop inclined portion; and the position limiting structure is provided with a position limiting flat portion and a position limiting inclined portion at a side thereof oriented toward the second outer surface, and the position limiting flat portion being in abutment with the stop flat portion, and the position limiting inclined portion being in abutment with the stop inclined portion are implemented.

16 Claims, 3 Drawing Sheets

THRUST COMPONENT, ASSEMBLY METHOD THEREFOR, AND APPARATUS

CROSS-REFERENCE TO RELATED APPLICATION

This application is a U.S. national stage application under 35 U.S.C. § 371 that claims the benefit of priority under 35 U.S.C. § 365 of International Patent Application No. PCT/CN2021/115534, filed on Aug. 31, 2021, designating the United States of America, the contents of which are relied upon and incorporated herein by reference in their entirety.

FIELD OF THE DISCLOSURE

The present application relates to the technical field of mechanical assembly, in particular to a thrust component, an assembly method therefor, and an apparatus.

BACKGROUND OF THE DISCLOSURE

Typically, stop rings are either flat stop ring or inclined stop rings.

SUMMARY OF THE DISCLOSURE

The object of the present application is to provide a thrust component, an assembly method therefor, and an apparatus so as to be used for solving the technical problems of flat stop rings that have a strong support ability for blocked members, but cannot compensate for axial clearances, and solving the technical problems of oblique angle stop rings that can compensate for axial clearances, but can only bear limited axial forces.

In order to achieve the above object, the present application provides a thrust component used for fixing an engaged member on a housing. The thrust component comprises a stop ring and a position limiting structure; the stop ring comprises a first outer surface and a second outer surface that are oppositely disposed; the first outer surface is in abutment with an end of the engaged member; the second outer surface is provided with a stop flat portion parallel to the first outer surface and a stop inclined portion connecting the stop flat portion and the first outer surface; the position limiting structure is disposed on the housing and used for clamping an edge of the stop ring to fix the engaged member; the position limiting structure is provided with a position limiting flat portion and a position limiting inclined portion at a side thereof oriented toward the second outer surface; and when the position limiting structure is in abutment with the second outer surface of the stop ring, the position limiting flat portion is in abutment with the stop flat portion, and the position limiting inclined portion is in abutment with the stop inclined portion.

In one embodiment of the present application, the position limiting structure is a slot structure; and the slot structure is annular slots disposed continuously or a plurality of arc-shaped slots disposed at intervals.

In one embodiment of the present application, the housing is cylindrical, and the position limiting structure is disposed along a circumferential direction of the housing and is perpendicular to an extension direction of the housing.

In one embodiment of the present application, the position limiting structure is disposed on an inner surface or an outer surface of the housing; when the position limiting structure is disposed on the inner surface of the housing, both the engaged member and the stop ring are disposed on an inner side of the housing; and when the position limiting structure is disposed on the outer surface of the housing, both the engaged member and the stop ring are disposed on an outer side of the housing.

In one embodiment of the present application, the stop ring is provided with an opening, and the opening is used for adjusting a diameter dimension of the stop ring so as to make the stop ring assembled into the position limiting structure.

In one embodiment of the present application, the first outer surface comprises a flat plane; the position limiting structure is provided with an assembly flat portion at a side thereof oriented toward the first outer surface; and when the stop ring is clamped in the position limiting structure, a distance between the assembly flat portion and the first outer surface is less than or equal to 1 millimeter ("mm").

In one embodiment of the present application, an included angle between a flat plane where the stop flat portion is located and a plane where the stop inclined portion is located is between 8 degrees and 25 degrees; and an included angle between a flat plane where the position limiting flat portion is located and a plane where the position limiting inclined portion is located is between 8 degrees and 25 degrees.

In one embodiment of the present application, a ratio of a length of the stop flat portion to a length of the stop inclined portion ranges from 1:5 to 1:3; and a ratio of a length of the position limiting flat portion to a length of the position limiting inclined portion ranges from 1:5 to 1:3.

In order to achieve the above object, the present application further provides an assembly method for the thrust component described above. The assembly method specifically comprises the following steps: a step of assembling the engaged member, wherein the engaged member is assembled on the housing, and an end of the engaged member and the position limiting structure are correspondingly disposed; and a step of assembling the stop ring, wherein the first outer surface of the stop ring is in abutment with the end of the engaged member, the second outer surface of the stop ring is in abutment with the position limiting structure, and the diameter dimension of the stop ring is adjusted such that the position limiting flat portion is in abutment with the stop flat portion and the position limiting inclined portion is in abutment with the stop inclined portion.

In order to achieve the above object, the present application further provides an apparatus. The apparatus comprises a housing and an engaged member fixed on the housing, and the apparatus further comprises the thrust component described above.

The present application has the following advantages: the present application provides a novel thrust component, an assembly method therefor, and an apparatus comprising the thrust component, the second outer surface of the stop ring is disposed to be provided with a stop flat portion and a stop inclined portion, the position limiting structure is provided with a position limiting flat portion and a position limiting inclined portion at a side thereof oriented toward the second outer surface, and the position limiting flat portion being in abutment with the stop flat portion and the position limiting inclined portion being in abutment with the stop inclined portion are implemented, such that the stop inclined portion is accommodated in the position limiting structure, and the stop flat portion can compensate for an axial clearance with the engaged member; and meanwhile, a large axial force can be borne, and after the axial stress disappears, the axial clearance can also be compensated. Compared with other current thrust components, the cost is lower, and convenience is brought to installation.

BRIEF DESCRIPTION OF THE DRAWINGS

In order to illustrate technical schemes in embodiments of the present application more clearly, accompanying drawings needed to be used in the description of the embodiments and will be introduced below.

DETAILED DESCRIPTION

Figure 1:
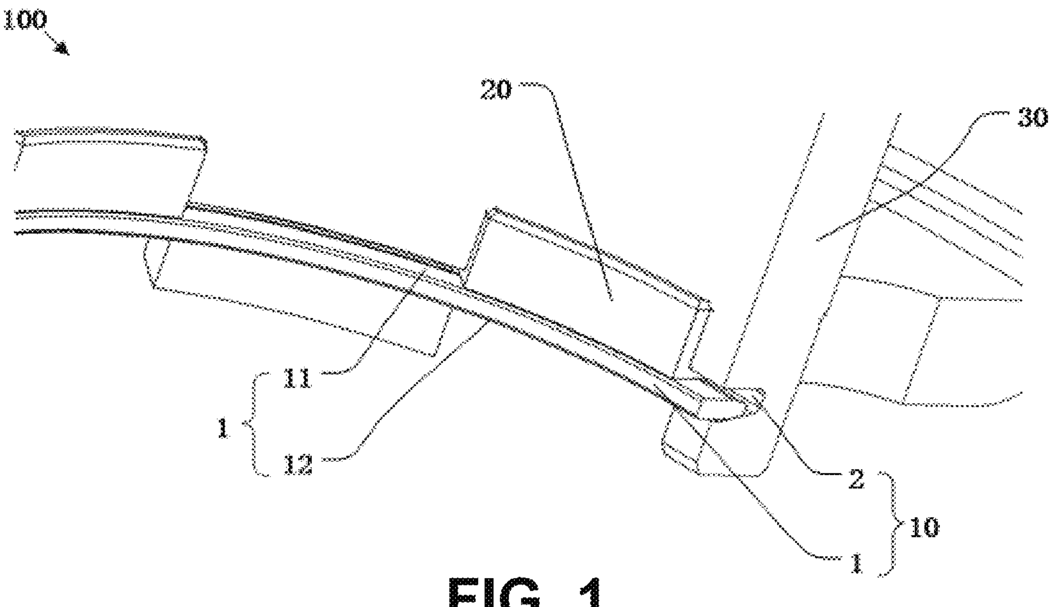
FIG. 1 is a three-dimensional cross-sectional structural diagram of the apparatus at a position of a thrust component in an embodiment of the present application, which mainly reflects the structure of the thrust component.

The following embodiments are described with reference to the accompanying drawings and are used for illustrating specific embodiments that may be implemented in the present disclosure. Directional terms mentioned in the present disclosure, for example, "up", "down", "front", "back", "left", "right", "top", "bottom" and the like, are only used for directions of reference to the accompanying drawings. Therefore, the directional terms are used for illustrating and understanding the present disclosure, rather than limiting the present disclosure. In addition, embodiments described in specific implementations are only some of the embodiments of the present disclosure, rather than all of the embodiments. On the basis of the embodiments of the present disclosure, all other embodiments obtained by persons of skill in the art without creative efforts shall fall within the scope of protection of the present disclosure.

Referring to FIGS. 1-5, the present application provides a thrust component 10 used for fixing an engaged member 20 on a housing 30. The thrust component 10 comprises a stop ring 1 and a position limiting structure 2; the stop ring 1 comprises a first outer surface 11 and a second outer surface 12 that are oppositely disposed; the first outer surface 11 is in abutment with an end of the engaged member 20; the second outer surface 12 is provided with a stop flat portion 121 parallel to the first outer surface 11 and a stop inclined portion 122 connecting the stop flat portion 121 and the first outer surface 11; the position limiting structure 2 is disposed on the housing 30 and used for clamping an edge of the stop ring 1 to fix the engaged member 20; the position limiting structure 2 is provided with a position limiting flat portion 21 and a position limiting inclined portion 22 at a side thereof oriented toward the second outer surface 12; and when the position limiting structure 2 is in abutment with the second outer surface 12 of the stop ring 1, the position limiting flat portion 21 is in abutment with the stop flat portion 121, and the position limiting inclined portion 22 is in abutment with the stop inclined portion 122.

Figure 2:
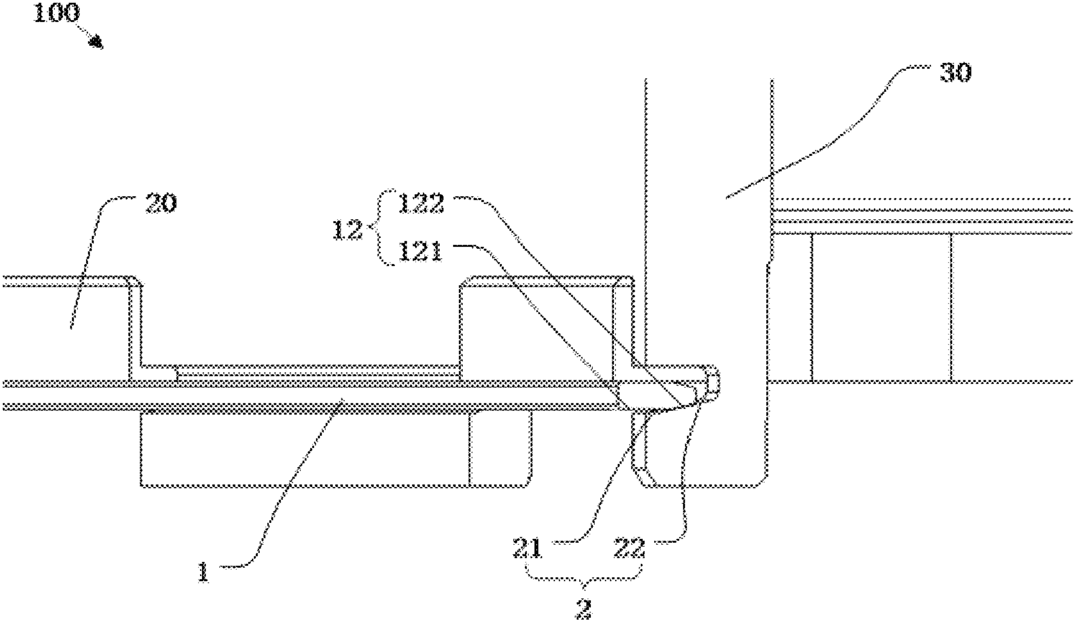
FIG. 2 is a cross-sectional diagram of the apparatus at the position of the thrust component in an embodiment of the present application.
Figures 5, 6:
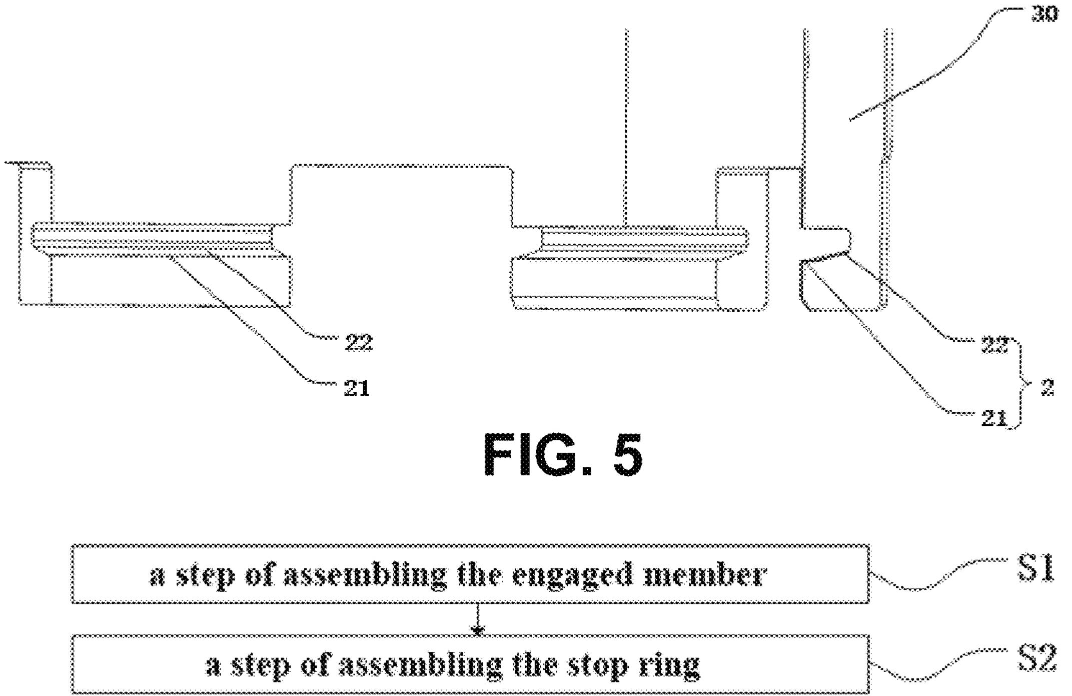
FIG. 5 is a cross-sectional schematic structural diagram of a position limiting structure in an embodiment of the present application.
FIG. 6 is a flow chart of an assembly method for the thrust component in an embodiment of the present application.

Referring to FIGS. 1, 2, and 5, in the present embodiment, the position limiting structure 2 is a slot structure; and the slot structure is annular slots disposed continuously or a plurality of arc-shaped slots disposed at intervals. The specific form of the slot structure of the position limiting structure 2 may be determined by a shape of the housing 30, which is not strictly limited in the present application.

Referring to FIGS. 1, 2, and 5, in the present embodiment, the housing 30 is cylindrical, and the position limiting structure 2 is disposed along a circumferential direction of the housing 30 and is perpendicular to an extension direction of the housing 30, namely, the position limiting structure 2 is disposed to be perpendicular to an axial direction of the housing 30.

Referring to FIGS. 1-4, in the present embodiment, the position limiting structure 2 is disposed on an inner surface or an outer surface 11 of the housing 30; when the position limiting structure 2 is disposed on the inner surface of the housing 30, both the engaged member 20 and the stop ring 1 are disposed on an inner side of the housing 30; and when the position limiting structure 2 is disposed on the outer surface 11 of the housing 30, both the engaged member 20 and the stop ring 1 are disposed on an outer side of the housing 30. The present embodiment is illustrated in a case that the position limiting structure 2 is disposed on the inner surface of the housing 30 and both the engaged member 20 and the stop ring 1 are disposed on the inner side of the housing 30.

Figure 3:
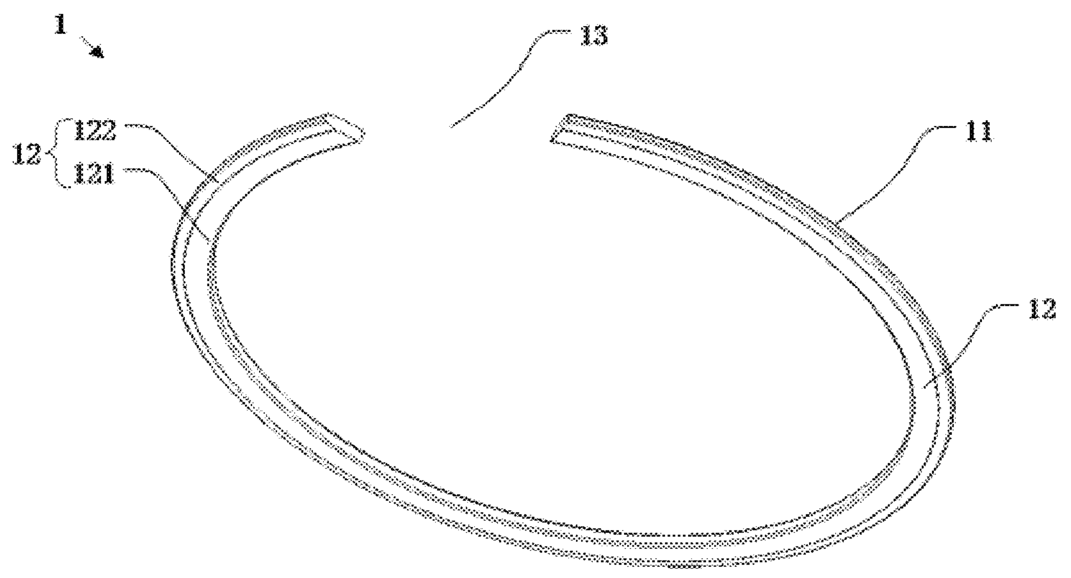
FIG. 3 is a three-dimensional schematic structural diagram of a stop ring in an embodiment of the present application.

Referring to FIG. 3, in the present embodiment, the stop ring 1 is provided with an opening 13, and the opening 13 is used for adjusting a diameter dimension of the stop ring 1 so as to make the stop ring assembled into the position limiting structure 2.

Figure 4:
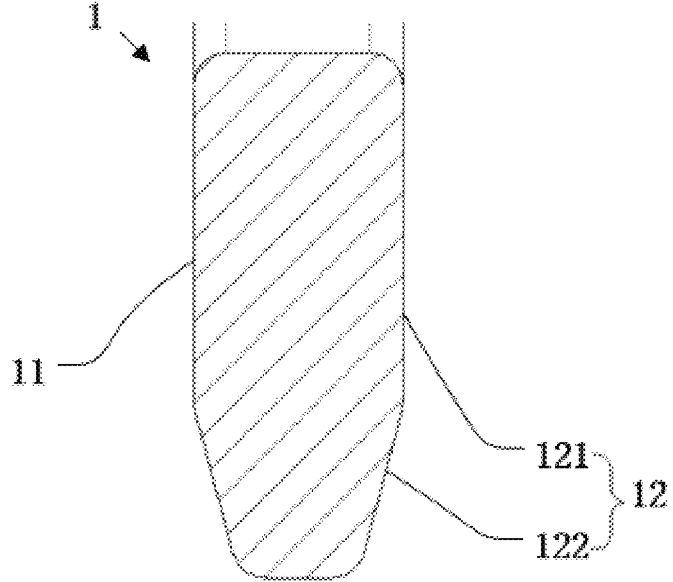
FIG. 4 is a cross-sectional diagram of the stop ring in an embodiment of the present application.

Referring to FIG. 4, in the present embodiment, the first outer surface 11 comprises a flat plane; the position limiting structure 2 is provided with an assembly flat portion at a side thereof oriented toward the first outer surface 11; or the first outer surface 11 and the second outer surface are disposed in a mirror image mode, the first outer surface also comprises the stop flat portion 121 and the stop inclined portion 122, and a flat plane included in the first outer surface 11 is the stop flat portion 121; and when the stop ring 1 is clamped in the position limiting structure 2, a distance between the assembly flat portion and the first outer surface 11 is less than or equal to 1 mm. Accordingly, an interference fit or a clearance fit between the assembly flat portion and the first outer surface 11 can be achieved, so that the stop inclined portion 122 is accommodated in the position limiting structure 2, and the stop flat portion 121 can compensate for an axial clearance with the engaged member 20; and meanwhile, a large axial force can be borne, and after the axial stress disappears, the axial clearance can also be compensated.

In the present embodiment, an included angle between a flat plane where the stop flat portion 121 is located and a flat plane where the stop inclined portion 122 is located is between 8 degrees and 25 degrees; and preferably, an included angle between a flat plane where the stop flat portion 121 is located and a flat plane where the stop inclined portion 122 is located is 15 degrees. Correspondingly, an included angle between a flat plane where the position limiting flat portion 21 is located and a flat plane where the position limiting inclined portion 22 is located is between 8 degrees and 25 degrees; and preferably, an included angle between a flat plane where the position limiting flat portion 21 is located and a flat plane where the position limiting inclined portion 22 is located is 15 degrees.

In the present embodiment, a ratio of a length of the stop flat portion 121 to a length of the stop inclined portion 122 ranges from 1:5 to 1:3; and correspondingly, a ratio of a length of the position limiting flat portion 21 to a length of the position limiting inclined portion 22 ranges from 1:5 to 1:3.

Referring to FIG. 6, in order to achieve the above object, the present application further provides an assembly method for the thrust component 10 described above. The assembly method specifically comprises the following steps:

S1, a step of assembling the engaged member, wherein the engaged member 20 is assembled on the housing 30, and an end of the engaged member 20 and the position limiting structure 2 are correspondingly disposed; and S2, a step of assembling the stop ring, wherein the first outer surface 11 of the stop ring 1 is in abutment with the end of the engaged member 20, the second outer surface 12 of the stop ring 1 is in abutment with the position limiting structure 2, and the diameter dimension of the stop ring 1 is adjusted such that the position limiting flat portion 21 is in abutment with the stop flat portion 121 and the position limiting inclined portion 22 is in abutment with the stop inclined portion 122.

Specifically, the stop ring 1 is provided with an opening 13, and the opening 13 is used for adjusting the diameter dimension of the stop ring 1 so as to make the stop ring assembled into the position limiting structure 2. Compared with other current thrust components 10, the thrust component 10 of the present embodiment has a lower cost, is convenient to install, and can bear a larger axial force. After the axial stress disappears, the axial clearance can also be compensated.

In order to achieve the above object, referring to FIGS. 1-5, the present application further provides an apparatus 100. The apparatus comprises a housing 30 and an engaged member 20 fixed on the housing 30. The apparatus 100 further comprises the thrust component 10 described above. The engaged member 20 may be disposed on an inner side surface of the housing 30 or an outer side surface of the housing 30. The thrust component 10 is able to firmly fix the engaged member 20 on the housing 30.

The present application has the following advantages: the present application provides a novel thrust component, an assembly method therefor, and an apparatus comprising the thrust component, the second outer surface of the stop ring is disposed to be provided with a stop flat portion and a stop inclined portion, the position limiting structure is provided with a position limiting flat portion and a position limiting inclined portion at a side thereof oriented toward the second outer surface, and the position limiting flat portion being in abutment with the stop flat portion and the position limiting inclined portion being in abutment with the stop inclined portion are implemented, such that the stop inclined portion is accommodated in the position limiting structure, and the stop flat portion can compensate for an axial clearance with the engaged member; and meanwhile, a large axial force can be borne, and after the axial stress disappears, the axial clearance can also be compensated. Compared with other current thrust components, the cost is lower, and convenience is brought to installation.

The above embodiments are illustrated only to help understanding of the technical schemes and core ideas of the present application. For persons of ordinary skill in the art, it shall be understood that modifications of the technical schemes recorded in the above embodiments or equivalent substitutions of some of technical features therein can still be made, and all these modifications or substitutions do not make the essence of the corresponding technical schemes departed from the scope of the technical schemes in the embodiments of the present application.

LIST OF REFERENCE NUMBERS

1 Stop ring
2 Position limiting structure
10 Thrust component
11 First outer surface
12 Second outer surface
13 Opening
20 Engaged member
21 Position limiting flat portion
22 Position limiting inclined portion
30 Housing
100 Apparatus
121 Stop flat portion
122 Stop inclined portion
S1 Step of assembling engaged member 20
S2 Step of assembling the stop ring 1

The invention claimed is:

1. A thrust component for fixing an engaged member on a housing, comprising:

a stop ring comprising a first outer surface and a second outer surface that are oppositely disposed, wherein the first outer surface is in abutment with an end of the engaged member, and the second outer surface includes a stop flat portion parallel to the first outer surface and a stop inclined portion connecting the stop flat portion and the first outer surface; and a position limiting structure disposed on the housing for clamping an edge of the stop ring to fix the engaged member, wherein the position limiting structure includes a position limiting flat portion and a position limiting inclined portion at a side thereof oriented toward the second outer surface, and when the position limiting structure is in abutment with the second outer surface of the stop ring, the position limiting flat portion is in abutment with the stop flat portion, and the position limiting inclined portion is in abutment with the stop inclined portion.

2. The thrust component of claim 1, wherein the position limiting structure is a slot structure, and the slot structure is an annular slot disposed continuously or a plurality of arc-shaped slots disposed at intervals.

3. The thrust component of claim 2, wherein the housing is cylindrical, and the position limiting structure is disposed along a circumferential direction of the housing and is perpendicular to an extension direction of the housing.

4. The thrust component of claim 2, wherein the position limiting structure is disposed on an inner surface of the housing, and both the engaged member and the stop ring are disposed on an inner side of the housing.

5. The thrust component of claim 1, wherein the stop ring includes an opening for adjusting a diameter dimension of the stop ring for assembly of the stop ring into the position limiting structure.

6. The thrust component of claim 1, wherein the first outer surface comprises a flat plane, the position limiting structure includes a flat portion at a side thereof that is oriented toward the first outer surface, and a distance between the flat portion and the first outer surface is less than or equal to 1 mm when the stop ring is clamped into the position limiting structure.

7. The thrust component of claim 1, wherein an included angle between a flat plane where the stop flat portion is located and a flat plane where the stop inclined portion is located is between 8 degrees and 25 degrees, and an included angle between a flat plane where the position limiting flat portion is located and a flat plane where the position limiting inclined portion is located is between 8 degrees and 25 degrees.

8. The thrust component of claim 1, wherein a ratio of a length of the stop flat portion to a length of the stop inclined portion ranges from 1:5 to 1:3, and a ratio of a length of the position limiting flat portion to a length of the position limiting inclined portion ranges from 1:5 to 1:3.

9. The thrust component of claim 2, wherein the position limiting structure is disposed on an outer surface of the housing, and both the engaged member and the stop ring are disposed on an outer side of the housing.

10. An apparatus, comprising:

a housing having a slot structure that includes a position limiting flat portion and a position limiting inclined portion;

an engaged member having an end that is at least partially received by the slot structure; and a stop ring having a first outer surface and a second outer surface opposite the first outer surface that includes a stop flat portion and a stop inclined portion, wherein the stop ring is at least partially received within the slot structure, such that the first outer surface is engaged with the end of the engaged member, the position limiting flat portion is in abutment with the stop flat portion, and the position limiting inclined portion is in abutment with the stop inclined portion to clamp the engaged member between the slot structure and the stop ring.

11. The apparatus of claim 10, wherein the housing includes an inner surface and an outer surface opposite the inner surface.

12. The apparatus of claim 11, wherein the slot structure is disposed on the inner surface of the housing.

13. The apparatus of claim 11, wherein the slot structure is disposed on the outer surface of the housing.

14. The apparatus of claim 10, wherein an included angle between a flat plane where the stop flat portion is located and a flat plane where the stop inclined portion is located is between 8 degrees and 25 degrees, and an included angle between a flat plane where the position limiting flat portion is located and a flat plane where the position limiting inclined portion is located is between 8 degrees and 25 degrees.

15. The apparatus of claim 10, wherein a ratio of a length of the stop flat portion to a length of the stop inclined portion ranges from 1:5 to 1:3, and a ratio of a length of the position limiting flat portion to a length of the position limiting inclined portion ranges from 1:5 to 1:3.

16. A method of assembling a thrust component and an engaged member to fix the engaged member to a housing, comprising the steps of:

assembling the engaged member on the housing, such that an end of the engaged member corresponds with a position limiting structure that is disposed on the housing and that includes a position limiting flat portion and a position limiting inclined portion; and assembling a stop ring such that a first outer surface of the stop ring is in abutment with the end of the engaged member, a second outer surface of the stop ring, which is opposite the first outer surface and includes a stop flat portion parallel to the first outer surface and a stop inclined portion extending between the first outer surface and the stop flat portion, is in abutment with the position limiting structure, and a diameter dimension of the stop ring is adjusted such that the position limiting flat portion of the position limiting structure is in abutment with the stop flat portion and the position limiting inclined portion is in abutment with the stop inclined portion.

* * * * *